United States Patent
Kuo

(10) Patent No.: US 9,191,810 B2
(45) Date of Patent: Nov. 17, 2015

(54) METHOD AND APPARATUS FOR HANDLING HANDOVER PROCEDURE

(75) Inventor: Richard Lee-Chee Kuo, Taipei (TW)

(73) Assignee: INNOVATIVE SONIC LIMITED, Ebene (MU)

( * ) Notice: Subject to any disclaimer, the term of this patent is extended or adjusted under 35 U.S.C. 154(b) by 1720 days.

(21) Appl. No.: 12/420,827

(22) Filed: Apr. 9, 2009

(65) Prior Publication Data

US 2009/0257399 A1 Oct. 15, 2009

Related U.S. Application Data

(60) Provisional application No. 61/044,058, filed on Apr. 11, 2008.

(51) Int. Cl.
*H04W 12/00* (2009.01)
*H04L 29/06* (2006.01)
*H04W 36/24* (2009.01)
*H04W 80/02* (2009.01)

(52) U.S. Cl.
CPC ............. *H04W 12/00* (2013.01); *H04L 63/20* (2013.01); *H04W 36/24* (2013.01); *H04W 80/02* (2013.01)

(58) Field of Classification Search
None
See application file for complete search history.

(56) References Cited

U.S. PATENT DOCUMENTS

2007/0293224 A1* 12/2007 Wang et al. .................. 455/436

FOREIGN PATENT DOCUMENTS

| EP | 2 003 839 A1 | 12/2008 |
|---|---|---|
| KR | 102003000537 A | 1/2003 |
| KR | 1020070096392 A | 10/2007 |
| WO | 2007130637 A2 | 11/2007 |
| WO | 2007130637 A3 | 11/2007 |

OTHER PUBLICATIONS

3GPP, Draft 3GPP Document: R2-08xxxx CR00xr1 to 36331(REL-8) on Miscelaneous clarifications and corrections—v01,Mar. 2008.*
Office Action on corresponding foreign application (KR1020090031295) from KIPO dated Nov. 16, 2010.
"Universal Mobile Telecommunications System (UMTS); Radio Resource Control (RRC); Protocol specification (3GPP TS 25.331 version 7.3.0 Release 7)," ETSI TS 125 331 V7.3.0, Dec. 2006, paragraph [8.3.1.9b], XP014036346, ETSI, France.
3GPP, R2-081542, Mar. 2008.
3GPP, R2-081543, Mar. 2008.
3GPP, Draft 3GPP Document: R2-08xxxx CR00xr1 to 36331(REL-8) on Miscelaneous clarifications and corrections—v01, Mar. 2008.
3GPP, 3GPP TS 36.323 V8.1.0, Mar. 2008.
3GPP, R2-081161, Feb. 2008.

* cited by examiner

*Primary Examiner* — Huy D Vu
*Assistant Examiner* — James P Duffy
(74) *Attorney, Agent, or Firm* — Blue Capital Law Firm, P.C.

(57) ABSTRACT

The present invention provides a method for handling a handover procedure for a Radio Resource Control (RRC) layer in a user equipment (UE) of a wireless communication system. The method includes steps of indicating occurrence of a handover procedure to a Packet Data Convergence Protocol (PDCP) layer of the UE when receiving an RRC Connection Reconfiguration message for triggering the handover procedure, applying a new security configuration to the PDCP layer if the RRC Connection Reconfiguration message includes an information element (IE) for providing the security configuration, and requesting a Medium Access Control (MAC) layer of the UE to initiate a random access procedure for the handover procedure.

10 Claims, 4 Drawing Sheets

METHOD AND APPARATUS FOR HANDLING HANDOVER PROCEDURE

CROSS REFERENCE TO RELATED APPLICATIONS

This application claims the benefit of U.S. Provisional Application No. 61/044,058, filed on Apr. 11, 2008 and entitled "Method and Apparatus for Improving Persistent Scheduling and Handover Procedure in a Wireless Communication System", the contents of which are incorporated herein by reference.

BACKGROUND OF THE INVENTION

1. Field of the Invention

The present invention relates to a method and apparatus for handling a handover procedure, and more particularly, to a method and apparatus for handling a handover procedure for a Radio Resource Control (RRC) layer in a user equipment (UE) of a wireless communication system.

2. Description of the Prior Art

Long Term Evolution wireless communication system (LTE system), an advanced high-speed wireless communication system established upon the 3G mobile telecommunication system, supports only packet-switched transmission, and tends to implement both Medium Access Control (MAC) layer and Radio Link Control (RLC) layer in one single communication site, such as in Node B (NB) alone rather than in NB and RNC (Radio Network Controller) respectively, so that the system structure becomes simple.

Communications protocols utilized in the LTE system include Access Stratum (AS) and Non-Access Stratum (NAS). AS comprises various sub-layers for different functions, including Radio Resource Control (RRC), Radio Link Control (RLC), Media Access Control (MAC), Packet Data Convergence Protocol (PDCP) and so on. The sub-layers mentioned, and their operating principles, are well known in the art, and detailed description thereof is omitted. The RRC layer, a Layer 3 protocol, is the core of communications protocols related to AS and is located in a network end and a user equipment (UE). The RRC layer uses RRC messages to perform RRC procedures. RRC messages are formed from many information elements (IEs) used for embedding necessary information for setting, changing, or releasing protocol entities of Layer 2 and Layer 1, thereby establishing, adjusting, or canceling information exchange channels to perform data packet transportation.

In LTE system, the network end indicates the UE to modify an RRC connection state, e.g. to establish/modify/release Radio Bearers (RBs), to perform a handover procedure, or to configure/modify radio measurements, through a RRC Connection Reconfiguration message. According to related specification, when the RRC Connection Reconfiguration message includes an Information Element (IE) "mobilityControlInformation", the UE shall perform the handover procedure as soon as possible following reception of the RRC Connection Reconfiguration message. In such a situation, the UE shall first synchronize to downlink of a target cell, and request the MAC layer to perform a random access procedure for accessing the target cell.

Upon successful completion of the handover procedure, i.e. when the MAC layer indicates the random access procedure is successfully completed, the UE shall perform the following steps:

(1) Apply a new security configuration (including security keys and security algorithms) to lower layers such as the PDCP layer if an IE "securityConfiguration" is included in the RRC Connection Reconfiguration message. That means the new security configuration shall be applied to all subsequent messages received and sent by the UE, including the message used to indicate the successful completion of the handover procedure.

(2) Update radio resource configurations based on an IE "radioResourceConfiguration" included in the received RRC Connection Reconfiguration message.

(3) Re-establish the RLC layer and reset the MAC layer.

(4) Indicate occurrence of the handover procedure to the PDCP layer.

Besides, when the RLC layer is re-established, the UE shall reassemble RLC Service Data Units (SDUs) and deliver the reassembled RLC SDUs to the PDCP layer no matter whether the SDUs are delivered in order of sequence numbers. That is to say, upon occurrence of the handover procedure, the RLC layer is allowed to deliver out-of-sequence Protocol Data Units (PDUs) received from a source cell to the PDCP layer. Detailed operation of re-establishing the RLC layer is not further described, and can be referred to in the related specifications.

On the other hand, according to the PDCP specification, when upper layers indicate that a handover procedure has occurred, for radio bearers that are mapped on Acknowledged Mode RLC entities, the UE shall perform maintenance of PDCP sequence numbers, header decompression and deciphering for PDCP PDUs received from lower layers and store the out-of-sequence PDCP SDUs, if any, in the reordering buffer until it is indicated to submit them to upper layers. Note that these out-of-sequence SDUs are received because of the lower layer re-establishment or reset.

However, based on the above operation, the UE has applied the new security configuration (including security keys and security algorithms) to the PDCP layer before the PDCP layer is indicated occurrence of the handover procedure, such that the PDCP layer of the UE cannot perform decompression and deciphering for the received PDCP PDUs correctly since the out-of-sequence SDUs, which are delivered due to the RLC layer re-establishment, are encrypted by original security configurations. Consequently, situations like data error or data lost may occur.

Besides, the random access procedure includes two types: contention based and non-contention based. If the random access procedure initiated by the handover procedure is contention based, the UE shall send a RRC Connection Reconfiguration Complete message during the random access procedure. This message is sent to the target cell and therefore new radio resource configuration and new security configuration are required. However, based on the above operation, the new radio resource configuration and the new security configuration are applied to the UE upon successful completion of the handover procedure, such that the target cell cannot correctly receive and interpret the RRC Connection Reconfiguration Complete message, resulting in failure of the handover procedure.

SUMMARY OF THE INVENTION

It is therefore an objective of the present invention to provide a method and apparatus for handling a handover procedure for a Radio Resource Control (RRC) layer in a user equipment (UE) of a wireless communication system.

According to the present invention, a method for handling a handover procedure for a Radio Resource Control (RRC) layer in a user equipment (UE) of a wireless communication system is disclosed. The method includes steps of indicating occurrence of a handover procedure to a Packet Data Convergence Protocol (PDCP) layer of the UE when receiving an RRC Connection Reconfiguration message for triggering the handover procedure, applying a new security configuration to the PDCP layer if the RRC Connection Reconfiguration message includes an information element (IE) for providing the security configuration, and requesting a Medium Access Control (MAC) layer of the UE to initiate a random access procedure for the handover procedure.

According to the present invention, a communications device for handling a handover procedure for a Radio Resource Control (RRC) layer in a user equipment (UE) of a wireless communication system is disclosed. The communications device includes a processor for executing a program code, and a memory, coupled to the processor, for storing the program code. The program code includes steps of indicating occurrence of a handover procedure to a Packet Data Convergence Protocol (PDCP) layer of the UE when receiving an RRC Connection Reconfiguration message for triggering the handover procedure, applying a new security configuration to the PDCP layer if the RRC Connection Reconfiguration message includes an information element (IE) for providing the security configuration, and requesting a Medium Access Control (MAC) layer of the UE to initiate a random access procedure for the handover procedure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
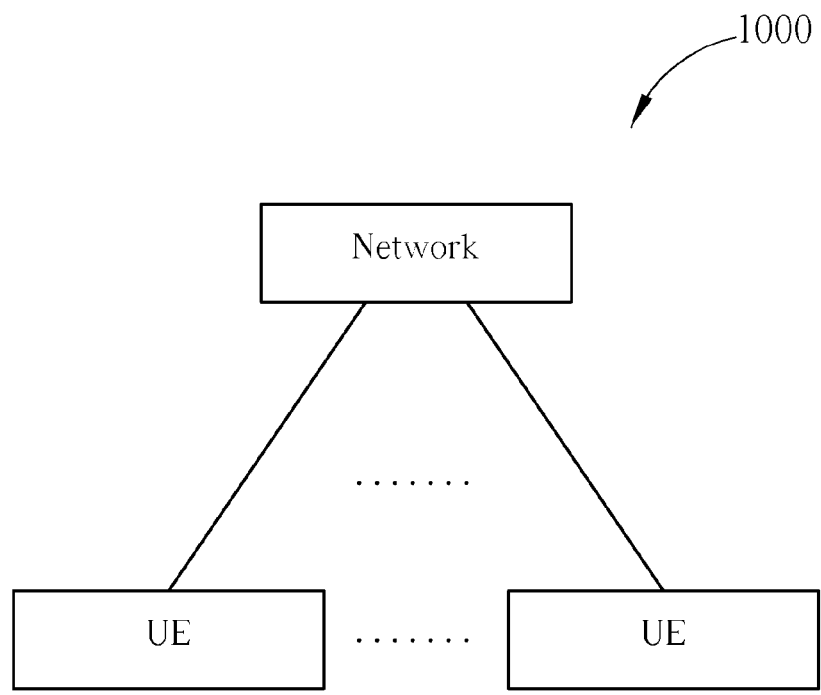
FIG. 1 is a schematic diagram of a wireless communications system.

Please refer to FIG. 1, which illustrates a schematic diagram of a wireless communications system 1000. The wireless communications system 1000 is preferred to be an LTE (long-term evolution) system, and is briefly composed of a network and a plurality of user equipments (UEs). In FIG. 1, the network and the UEs are simply utilized for illustrating the structure of the wireless communications system 1000. Practically, the network may comprise a plurality of base stations (Node Bs), radio network controllers and so on according to actual demands, and the UEs can be devices such as mobile phones, computer systems, etc.

Figure 2:
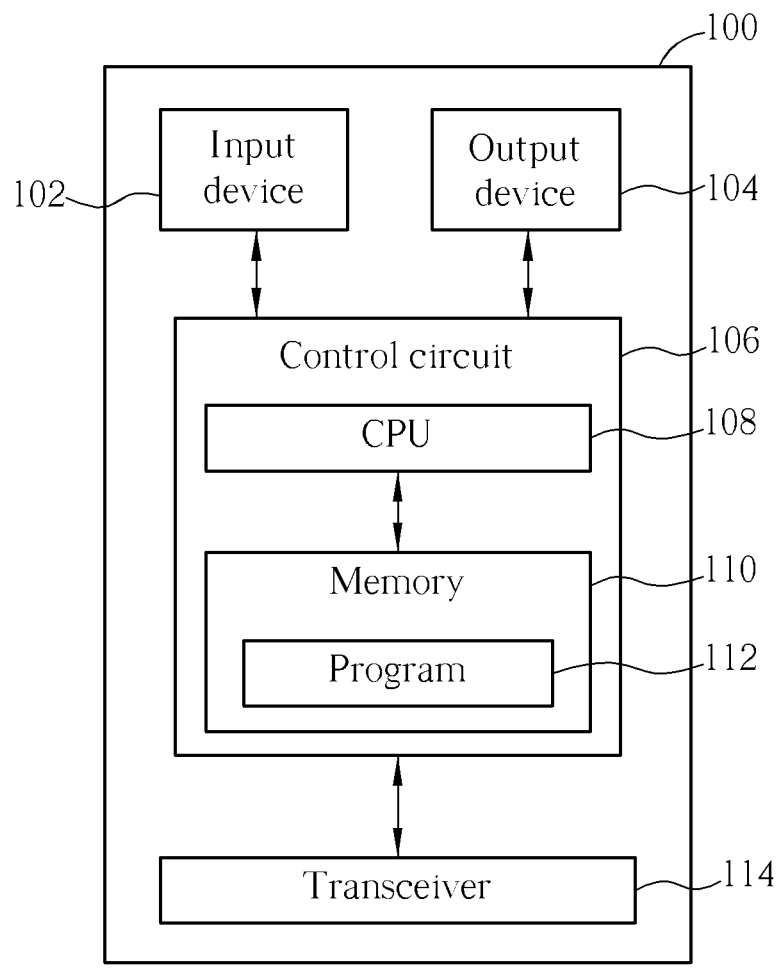
FIG. 2 is a function block diagram of a wireless communications device.

Please refer to FIG. 2, which is a functional block diagram of a communications device 100 in a wireless communications system. The communications device 100 can be utilized for realizing the UEs in FIG. 1, and the wireless communications system is preferably the LTE system. For the sake of brevity, FIG. 2 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 3:
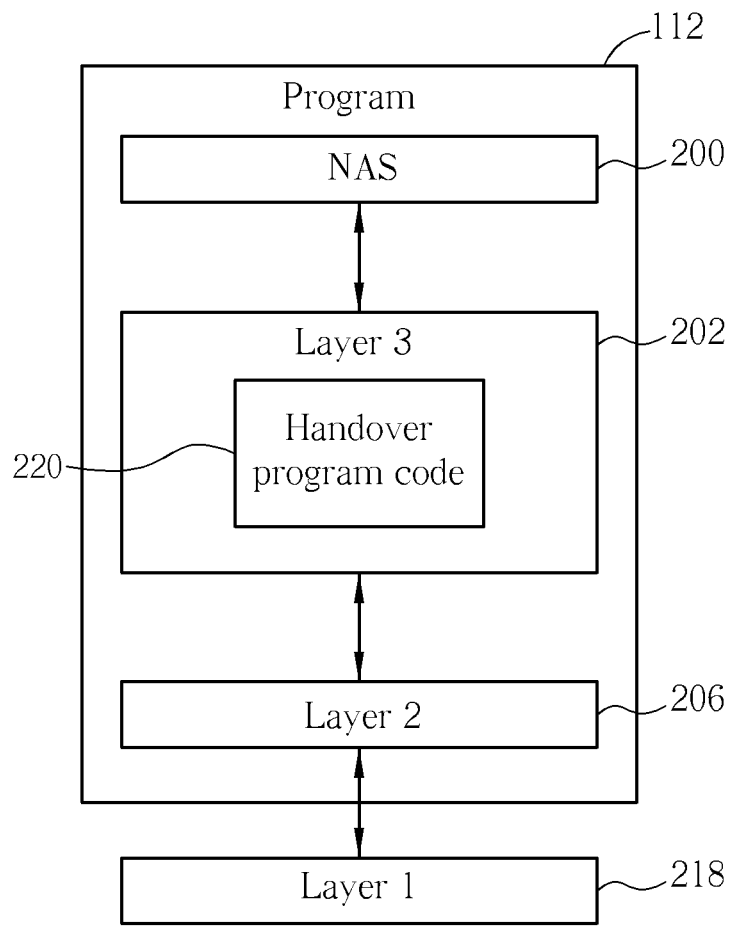
FIG. 3 is a diagram of program code of FIG. 2.

Please continue to refer to FIG. 3. FIG. 3 is a diagram of the program code 112 shown in FIG. 2. The program code 112 includes a Non-Access Stratum (NAS) 200, a Layer 3 202, and a Layer 2 206, and is coupled to a Layer 1 218. The NAS 200 can generate NAS messages for realizing NAS applications. The Layer 3 202 comprises a Radio Resource Control (RRC) layer and a Packet Data Convergence Protocol (PDCP) layer, and performs radio resource control. The Layer 2 206 comprises a Radio Link Control (RLC) layer and a Medium Access Control (MAC) layer, and performs link control. The Layer 1 218 performs physical connections.

Figure 4:
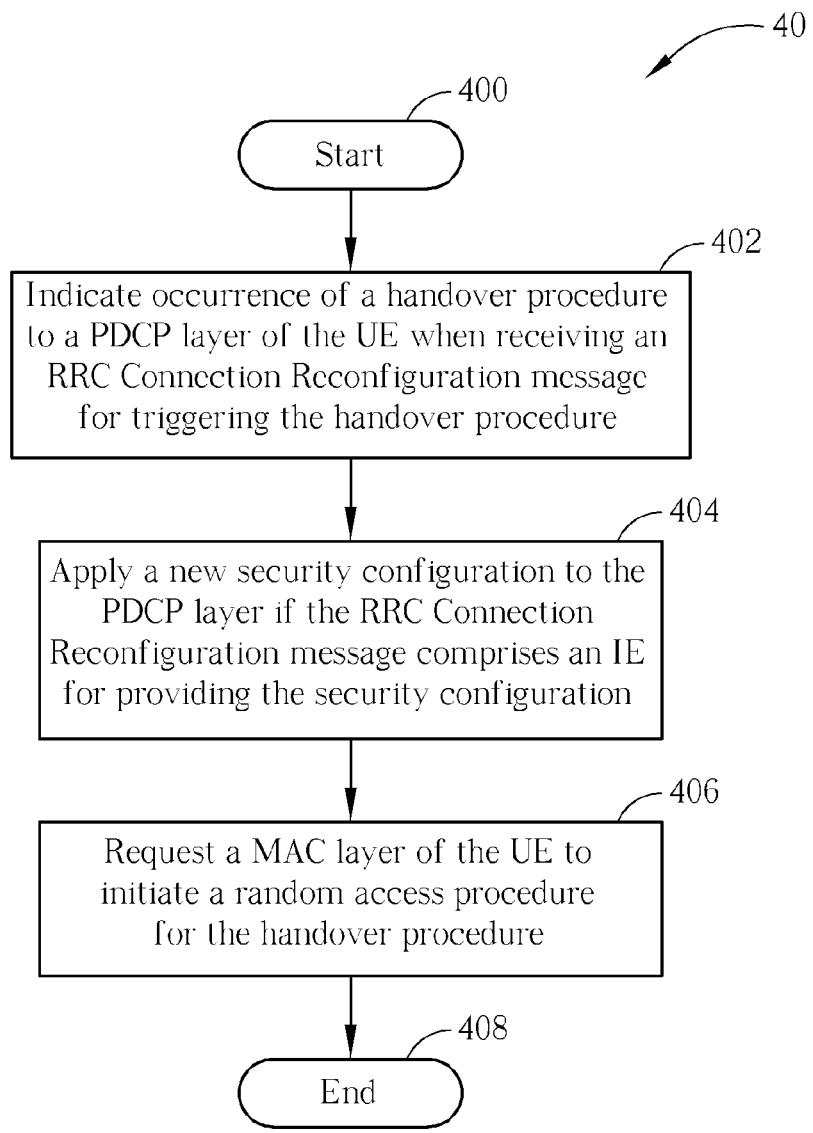
FIG. 4 is a flowchart of a process according to an embodiment of the present invention.

In the LTE system, upon reception of a handover command, i.e. an RRC Connection Reconfiguration message including an Information Element (IE) "mobilityControlInformation", the UE shall perform a handover procedure as soon as possible. In such a situation, the embodiment of the present invention provides a handover program code 220 for accurately handling a handover procedure to avoid occurrence of data error or lost and failure of the handover procedure. Please refer to FIG. 4, which illustrates a schematic diagram of a process 40. The process 40 is utilized for handling a handover procedure for a RRC layer in a UE of the wireless communications system 1000, and comprises the following steps:

Step 400: Start.

Step 402: Indicate occurrence of a handover procedure to a PDCP layer of the UE when receiving an RRC Connection Reconfiguration message for triggering the handover procedure.

Step 404: Apply a new security configuration to the PDCP layer if the RRC Connection Reconfiguration message comprises an IE for providing the security configuration.

Step 406: Request a MAC layer of the UE to initiate a random access procedure for the handover procedure Step 408: End.

According to the process 40, the RRC layer of the UE indicates occurrence of the handover procedure to the PDCP layer when receiving the RRC Connection Reconfiguration message for triggering the handover procedure, i.e. the RRC Connection Reconfiguration message with an IE "mobilityControlInformation". Then, the RRC layer of the UE applies the new security configuration to the PDCP layer if the RRC Connection Reconfiguration message includes an IE for providing the security configuration, such as an IE "securityConfiguration". Finally, the RRC layer of the UE requests the MAC layer to initiate a random access procedure for the handover procedure, so as to access a target cell.

Preferably, in the embodiment of the present invention, the process 40 further includes steps of re-establishing the RLC layer of the UE after indicating the occurrence of the handover procedure to the PDCP layer and before applying the security configuration to the PDCP layer, i.e. between Step 402 and the Step 404.

In this case, since the RRC layer of the UE has indicated occurrence of the handover procedure to the PDCP layer before applying the new security configuration to the PDCP layer, the PDCP layer of the UE can thus use original security configurations (such as security keys and security algorithms) to perform decompression and deciphering for the Packet Data Units (PDUs) that are delivered out of sequence due to the RLC layer re-establishment, and thereby avoid occurrence of data error or lost.

In addition, after correctly dealing with the out-of-sequence RLC PDUs, the RRC layer of the UE then applies the new security configuration (including security keys and security algorithms) to the PDCP layer for reception and transmission of all subsequent messages based on the IE "securityConfiguration" included in the RRC Connection Reconfiguration message.

Therefore, when the MAC layer of the UE performs the random access procedure for the handover procedure, the target cell can correctly receive and interpret messages sent by the UE, such as an RRC Connection Reconfiguration Complete message, so as to avoid the failure of the handover procedure as stated in the prior art.

Certainly, the process 40 can further includes steps of updating a radio resource configuration of the UE according to an IE "radioResourceConfiguration" included in the RRC Connection Reconfiguration message before requesting the MAC layer to initiate the random access procedure, to ensure the messages sent by the UE can be received by the target cell. Such variation also belongs to the scope of the present invention.

In summary, the embodiment of the present invention provides a method for handling the handover procedure in the RRC layer of the UE upon reception of the handover command to avoid occurrence of data error or lost and failure of the handover procedure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for handling a handover procedure for a Radio Resource Control (RRC) layer in a user equipment (UE) of a wireless communication system, the method comprising:
   indicating occurrence of a handover procedure to a Packet Data Convergence Protocol (PDCP) layer of the UE when receiving an RRC Connection Reconfiguration message for triggering the handover procedure;
   applying a new security configuration to the PDCP layer if the RRC Connection Reconfiguration message comprises an information element (IE) for providing the security configuration after indicating occurrence of the handover procedure to the PDCP layer; and
   requesting a Medium Access Control (MAC) layer of the UE to initiate a random access procedure for the handover procedure after applying the new security configuration to the PDCP layer.

2. The method of claim 1 further comprising:
   re-establishing a Radio Link Control (RLC) layer of the UE after indicating the occurrence of the handover procedure to the PDCP layer and before applying the security configuration to the PDCP layer.

3. The method of claim 1 further comprising:
   updating a radio resource configuration of the UE according to an IE "radioResourceConfiguration" included in the RRC Connection Reconfiguration message before requesting the MAC layer to initiate the random access procedure.

4. The method of claim 1, wherein the RRC Connection Reconfiguration message comprises an IE "mobilityControlInformation" for triggering the handover procedure in the RRC layer of the UE.

5. The method of claim 1, wherein the information element for providing the security configuration is an IE "securityConfiguration".

6. A communication device for handling a handover procedure for a Radio Resource Control (RRC) layer in a user equipment (UE) of a wireless communication system, the communication device comprising:
   a processor; and
   a memory coupled to the processor;
   wherein the processor is configured to execute a program code stored in the memory to
     indicate occurrence of a handover procedure to a Packet Data Convergence Protocol (PDCP) layer of the UE when receiving an RRC Connection Reconfiguration message for triggering the handover procedure;
     apply a new security configuration to the PDCP layer if the RRC Connection Reconfiguration message comprises an information element (IE) for providing the security configuration after indicating occurrence of the handover procedure to the PDCP layer; and
     request a Medium Access Control (MAC) layer of the UE to initiate a random access procedure for the handover procedure after applying the new security configuration to the PDCP layer.

7. The communication device of claim 6, wherein the processor is further configured to execute the program code stored in the memory to:
   re-establish a Radio Link Control (RLC) layer of the UE after indicating the occurrence of the handover procedure to the PDCP layer and before applying the security configuration to the PDCP layer.

8. The communication device of claim 6, wherein the processor is further configured to execute the program code stored in the memory to:
   update a radio resource configuration of the UE according to an IE "radioResourceConfiguration" included in the RRC Connection Reconfiguration message before requesting the MAC layer to initiate the random access procedure.

9. The communication device of claim 6, wherein the RRC Connection Reconfiguration message comprises an 1E "mobilityControlInformation" for triggering the handover procedure in the RRC layer of the UE.

10. The communication device of claim 6, wherein the information element for providing the security configuration is an IE "securityConfiguration".

* * * * *